United States Patent
Guering

(10) Patent No.: US 10,392,096 B2
(45) Date of Patent: Aug. 27, 2019

(54) ACCESS DEVICE PROVIDED WITH A FOLDING DOOR ENABLING SECURE COMMUNICATION BETWEEN AT LEAST TWO ZONES OF AN ENCLOSURE

(71) Applicant: Airbus Operations S.A.S., Toulouse (FR)

(72) Inventor: Bernard Guering, Montrabe (FR)

(73) Assignee: Airbus Operations S.A.S. (FR)

( * ) Notice: Subject to any disclaimer, the term of this patent is extended or adjusted under 35 U.S.C. 154(b) by 510 days.

(21) Appl. No.: 15/150,674

(22) Filed: May 10, 2016

(65) Prior Publication Data
US 2016/0332718 A1  Nov. 17, 2016

(30) Foreign Application Priority Data
May 12, 2015 (FR) ..................... 15 54248

(51) Int. Cl.
*B64C 1/14* (2006.01)
*B64D 11/02* (2006.01)
(Continued)

(52) U.S. Cl.
CPC .......... *B64C 1/1438* (2013.01); *B64C 1/1469* (2013.01); *B64D 11/00* (2013.01);
(Continued)

(58) Field of Classification Search
CPC ... B64C 1/1438; B64C 1/1469; B64C 1/1461; B64C 1/1407; B64C 1/14; B64D 11/00;
(Continued)

(56) References Cited

U.S. PATENT DOCUMENTS

| | | | | |
|---|---|---|---|---|
| 3,658,277 A | * | 4/1972 | Anderson | B64C 1/1469 109/8 |
| 3,718,171 A | * | 2/1973 | Godwin | B64C 1/1415 160/188 |
| 4,565,030 A | * | 1/1986 | LaSance | E05D 15/02 49/141 |
| 4,597,549 A | * | 7/1986 | Ryan | B64C 1/10 160/127 |

(Continued)

FOREIGN PATENT DOCUMENTS

| | | |
|---|---|---|
| EP | 2 727 823 A2 | 5/2014 |
| FR | 2 965 793 A1 | 4/2012 |

(Continued)

OTHER PUBLICATIONS

Search Report FR 1554248 dated Dec. 17, 2015.
Search Report FR 1554238 dated Dec. 17, 2015.

*Primary Examiner* — Medhat Badawi
(74) *Attorney, Agent, or Firm* — Lerner, David, Littenberg, Krumholz & Mentlik, LLP

(57) ABSTRACT

An access device enables controlled or secure communication between different areas of an enclosure, and in the example illustrated in the present application of an aircraft, while providing reduced size. The access device includes a folding door which, when in folded position, allows at least one of said openings to be closed and, when in deployed position, forms a security vestibule with at least one movable shutter allowing said opening created by the deployment of said folding door to be closed. By superimposing the main components of the security vestibule that said components allow to close, the device frees up the adjoining cabin space when the security vestibule is not in use.

11 Claims, 6 Drawing Sheets

(51) Int. Cl.
*E06B 3/48* (2006.01)
*E06B 3/80* (2006.01)
*B64D 11/00* (2006.01)
*B64D 45/00* (2006.01)

(52) U.S. Cl.
CPC .......... *B64D 11/0023* (2013.01); *B64D 11/02* (2013.01); *B64D 45/0015* (2013.01); *E06B 3/481* (2013.01); *E06B 3/805* (2013.01); *B64D 2011/0046* (2013.01)

(58) Field of Classification Search
CPC ................ B64D 11/0023; B64D 11/02; B64D 2011/0046; B64D 45/0015; E06B 3/481; E06B 3/805
See application file for complete search history.

(56) References Cited

U.S. PATENT DOCUMENTS

| | | | | |
|---|---|---|---|---|
| 4,598,495 A * | 7/1986 | Labarile | ............... | E05G 5/003 49/35 |
| 5,149,012 A * | 9/1992 | Valverde | ............. | B64C 29/0025 244/12.2 |
| 5,150,863 A * | 9/1992 | Hozumi | ................. | B64D 11/00 244/118.5 |
| 5,451,822 A * | 9/1995 | Bechtel | .................. | B60Q 1/143 307/9.1 |
| 5,474,345 A * | 12/1995 | Clark | ........................ | E05C 7/02 292/302 |
| 6,182,926 B1 * | 2/2001 | Moore | .................. | B64D 11/00 244/118.5 |
| 6,257,523 B1 * | 7/2001 | Olliges | ................ | B61D 17/048 160/210 |
| 6,317,248 B1 * | 11/2001 | Agrawal | ................. | G02F 1/155 340/438 |
| 6,375,562 B1 * | 4/2002 | Hein | ....................... | E06B 3/903 454/188 |
| 6,470,512 B1 * | 10/2002 | Lau | ........................... | A47K 3/30 4/612 |
| 6,493,128 B1 * | 12/2002 | Agrawal | ........... | B32B 17/10036 244/129.3 |
| 6,601,797 B2 * | 8/2003 | Sheremeta | ............ | B64C 1/1469 244/118.5 |
| 6,696,979 B2 * | 2/2004 | Manten | .................. | B64C 1/1469 180/287 |
| 6,702,231 B2 * | 3/2004 | Ward | .................... | B64C 1/1469 244/118.5 |
| 6,745,982 B2 * | 6/2004 | Lehmann | .............. | B64C 1/1469 244/118.5 |
| 6,823,927 B2 * | 11/2004 | Steel | ........................ | E05D 3/022 16/49 |
| 6,880,785 B2 * | 4/2005 | Barbara | ................ | B64C 1/1469 244/118.5 |
| 6,925,756 B2 * | 8/2005 | Roessner | .............. | B64C 1/1469 244/129.4 |
| 6,980,104 B2 * | 12/2005 | Pahl | ....................... | B64C 1/1469 244/1 R |
| 7,249,737 B2 * | 7/2007 | Simmons | ............... | B64C 1/1469 244/129.4 |
| 7,721,990 B2 * | 5/2010 | Jaeger | ................... | B64D 11/00 244/118.6 |
| 7,823,834 B2 * | 11/2010 | French | ................... | B64C 1/1469 244/129.4 |
| 7,959,453 B2 * | 6/2011 | Guering | ............. | E05D 11/0081 361/616 |
| 7,984,875 B2 * | 7/2011 | Koehn | ................... | B64C 1/1469 244/118.5 |
| 8,398,026 B2 * | 3/2013 | Walton | ................... | B64D 1/06 244/102 R |
| 8,544,795 B2 * | 10/2013 | Guering | ................. | B64D 11/00 244/118.5 |
| 8,627,601 B2 * | 1/2014 | Farrell | ..................... | E06B 3/90 49/40 |
| 8,876,050 B2 * | 11/2014 | Wentland | .............. | B64C 1/1407 244/118.5 |
| 8,925,863 B2 * | 1/2015 | Pujol | .................... | B64C 1/1469 244/118.5 |
| 9,045,214 B2 * | 6/2015 | Koch | ..................... | B64C 1/1469 |
| 9,073,619 B2 * | 7/2015 | Moje | ..................... | B64C 1/1469 |
| 9,079,666 B2 * | 7/2015 | Guering | ................. | B64C 1/1469 |
| 9,308,997 B2 * | 4/2016 | Scown | ................... | B64D 11/02 |
| 9,637,235 B2 * | 5/2017 | Pujol | .................... | B64C 1/1407 |
| 9,688,407 B2 * | 6/2017 | McIntosh | .............. | B64D 11/02 |
| 9,944,380 B2 * | 4/2018 | Guering | ................. | B64C 1/1407 |
| 2002/0044331 A1 * | 4/2002 | Agrawal | ................. | G02F 1/155 359/265 |
| 2002/0092951 A1 * | 7/2002 | Haviv | ................... | B64C 1/1469 244/118.5 |
| 2003/0051421 A1 * | 3/2003 | Fields | .................... | E05B 65/462 52/202 |
| 2003/0066931 A1 * | 4/2003 | Ward | .................... | B64C 1/1469 244/118.5 |
| 2003/0206326 A1 * | 11/2003 | Berneth | .................... | C09K 9/02 359/265 |
| 2004/0089766 A1 * | 5/2004 | Semprini | ................ | B64C 1/1469 244/118.5 |
| 2004/0173327 A1 * | 9/2004 | Steel | ........................ | E05D 3/022 160/210 |
| 2005/0116098 A1 * | 6/2005 | Martens | ................ | B64C 1/1469 244/118.5 |
| 2005/0230550 A1 * | 10/2005 | Dominguez | .......... | B64C 1/1469 244/129.5 |
| 2005/0247823 A1 * | 11/2005 | Wood | ..................... | B29C 45/14 244/129.5 |
| 2006/0032977 A1 | 2/2006 | Simmons et al. | | |
| 2006/0065782 A1 * | 3/2006 | French | ................... | B64C 1/1469 244/118.5 |
| 2006/0169839 A1 * | 8/2006 | French | .................. | B64C 1/1469 244/118.5 |
| 2006/0169840 A1 * | 8/2006 | French | .................. | B64C 1/1469 244/118.5 |
| 2006/0245620 A1 * | 11/2006 | Roques | .............. | B64D 45/0015 382/115 |
| 2007/0113478 A1 * | 5/2007 | Chu | ........................ | E05C 7/02 49/67 |
| 2008/0310005 A1 * | 12/2008 | Tonar | ........................ | B60R 1/00 359/265 |
| 2009/0065641 A1 * | 3/2009 | Koehn | ................... | B64C 1/1469 244/118.5 |
| 2010/0219292 A1 * | 9/2010 | Saint-Jalmes | ....... | B64D 11/0023 244/118.5 |
| 2011/0080629 A1 * | 4/2011 | Neuman | ................ | G02F 1/155 359/265 |
| 2011/0084808 A1 * | 4/2011 | Tuttle | .................... | G06K 17/00 340/10.1 |
| 2013/0126671 A1 * | 5/2013 | Guering | ................. | B64D 11/06 244/118.6 |
| 2013/0269258 A1 * | 10/2013 | Koch | ..................... | B64C 1/1469 49/67 |
| 2014/0021725 A1 * | 1/2014 | Baty | ....................... | E05B 47/0012 292/144 |
| 2015/0096118 A1 * | 4/2015 | McIntosh | .............. | B64D 11/02 4/664 |
| 2016/0332718 A1 * | 11/2016 | Guering | ................. | B64C 1/1438 |
| 2017/0130518 A1 * | 5/2017 | Christenson | ............ | E06B 5/00 |
| 2018/0038134 A1 * | 2/2018 | Lin | ......................... | E05B 63/04 |
| 2018/0066449 A1 * | 3/2018 | Kamody | ................. | E05B 15/0245 |

FOREIGN PATENT DOCUMENTS

| | | |
|---|---|---|
| NL | 1 019 944 C2 | 8/2003 |
| WO | 03/057563 A1 | 7/2003 |
| WO | 2011/055097 | 5/2011 |
| WO | 2012/045931 A1 | 4/2012 |

* cited by examiner

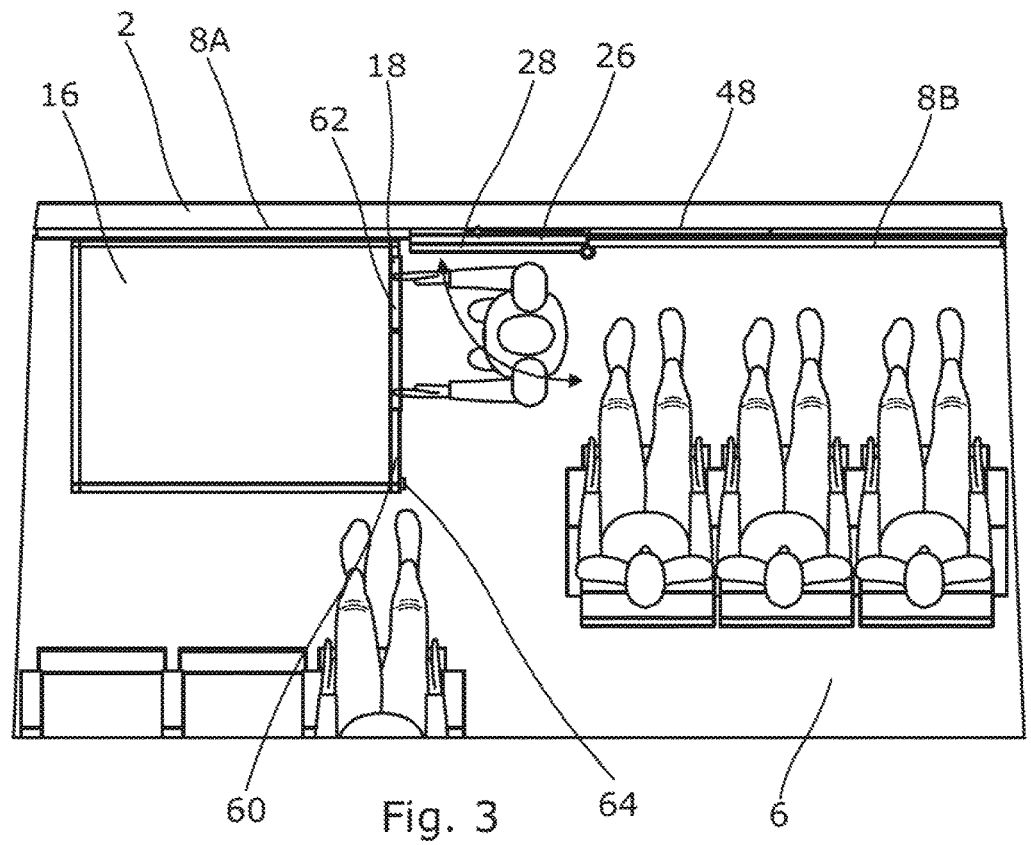
Fig. 3
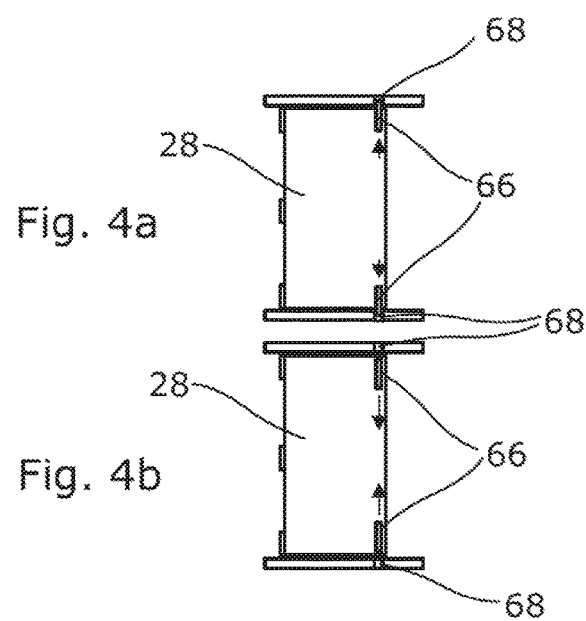
Fig. 4a
Fig. 4b

ACCESS DEVICE PROVIDED WITH A FOLDING DOOR ENABLING SECURE COMMUNICATION BETWEEN AT LEAST TWO ZONES OF AN ENCLOSURE

FIELD OF THE INVENTION

The present invention relates to an access device enabling controlled or secure communication between different areas of an enclosure and, for example, an aircraft. More particularly, the device notably enables cockpit access to be protected from the cabin. The present invention also relates to an aircraft equipped with such an access device.

BACKGROUND OF THE INVENTION

In today's aircraft, the cockpit is separated from the cabin by a reinforced separating partition provided with an access door. The door can be locked from inside the cockpit to prevent all aggressions from the cabin. The cabin can have different types of layouts near the cockpit:

Toilet facilities adjoining the separating partition between the cabin and cockpit and positioned on one side of the door of said partition;

Toilet and kitchen facilities adjoining the separating partition between the cabin and cockpit and positioned on either side of the door of said partition in a direction transverse to the aircraft;

Passenger seats placed near the separating partition between the cabin and cockpit.

Very few aircraft have toilet facilities dedicated solely to pilots. Pilots must exit the cockpit to use the toilet facilities intended for passengers. Pilots may also want to access the cabin, for example, to check the status of an aircraft system. The crew of an aircraft may also need to access the cockpit for example to serve the pilots meals. However, using the access door exposes the pilots to aggressions from the cabin.

A configuration exists providing toilet and kitchen facilities adjoining the cockpit and arranged on either side of the cockpit access door. In this case, toilet and kitchen facilities form a corridor providing protection to the cockpit access. However, in other configurations, an additional protection system must be provided such as a security vestibule.

Protecting the access to the cockpit by a security vestibule formed by mobile partitions able to move independently from one another so as to provide a single opening therebetween which makes it possible to access the cockpit or the cabin is known from patent FR2965793, filed 8 Oct. 2010. This device has the drawback of occupying a significant volume in the cabin, particularly in the configurations wherein the seats are near the partition separating the cockpit from the cabin. For passenger comfort, a minimum perimeter is required to access the security vestibule thus taking up cabin space for the passenger seats.

BRIEF SUMMARY OF THE INVENTION

To do this, the present invention proposes an access device enabling secure communication between at least two areas of an enclosure through at least one opening, characterized in that it comprises a folding door which, when in folded position, allows at least one of said openings to be closed and, when in deployed position, forms a security vestibule with at least one movable shutter allowing said opening created by the deployment of said folding door to be closed.

By superimposing the main components of the security vestibule that said components allow to close, the device frees up the adjoining cabin space when the security vestibule is not in use. This results in a simple and collapsible security system allowing space to be freed up in the cabin and to increase the number of passenger seats.

The invention has at least one of the following optional features, taken alone or in combination.

The security vestibule is formed by the folding door, the movable shutter and partitions/walls between said areas of said enclosure against one of which one of the ends of the folding door is secured, as well as one of the doors at the level of said wall(s).

The folding door is a folding door with two leaves in the form of two solid panels rotatably hinged relative to one another and whose shape and identical dimensions are such that the panels overlap and fit together snugly in said opening so as to completely close it.

One of the longitudinal edges of said folding door is rotatably hinged on one of the longitudinal edges of said opening that it closes.

The movable shutter is placed against a partition separating two areas, moving in translation along the latter and has dimensions such that it completely fills the opening in said partition to close it.

Retaining, positioning and locking means are provided on the folding door and cooperate with corresponding means provided on the stationary structures of the enclosure to block the door in the closed folded position and in the deployed security vestibule position.

Reinforcements are provided at the edges of the partition adjacent to the folding door to absorb its thickness, or when the partition adjacent to the folding door includes two offset parts, to absorb the thickness of the folding door.

The present invention also relates to an aircraft comprising at least two areas and an access device having the aforementioned features and enabling secure communication therebetween.

One of these areas is the cockpit, and another of these areas is the cabin; the folding door closes the access between the cabin and the cockpit.

It is also possible that another one of these areas is the toilet facilities; the deployed folding door rests on one of the walls of the toilet facilities so as to form a security vestibule with said wall, the door of the toilet facilities, the partition and the shutter.

The present invention also relates to an access control method for secure communication between at least two areas of an enclosure through at least one opening; the method consists in deploying a folding door from a folded position in which the door closes at least one of said openings to a position wherein the door forms a security vestibule with at least one movable shutter allowing said opening created by the deployment of the door to be closed.

BRIEF DESCRIPTION OF THE DRAWINGS

Other purposes, advantages and characteristics of the invention will become apparent upon reading the description which will follow, given by way of non-limiting example in reference to the accompanying drawings wherein:

FIG. 3 is a schematic top view of another embodiment of the access device integrated in a front part of an aircraft;

FIGS. 4a and 4b are schematic side views that schematically illustrate the locking means of the access device in the locked position and in the release position, respectively;

DETAILED DESCRIPTION

As shown in FIGS. 1 to 5, the access device 1 is presented in the following description in the illustrative and non-limiting framework of access to a cockpit 2 in an aircraft 4. The access device can be used in any application requiring secure access to several adjoining areas of an enclosure and to completely free up the space taken by the access device in certain areas when no access or only unsecured access to them is required.

Figure 1:
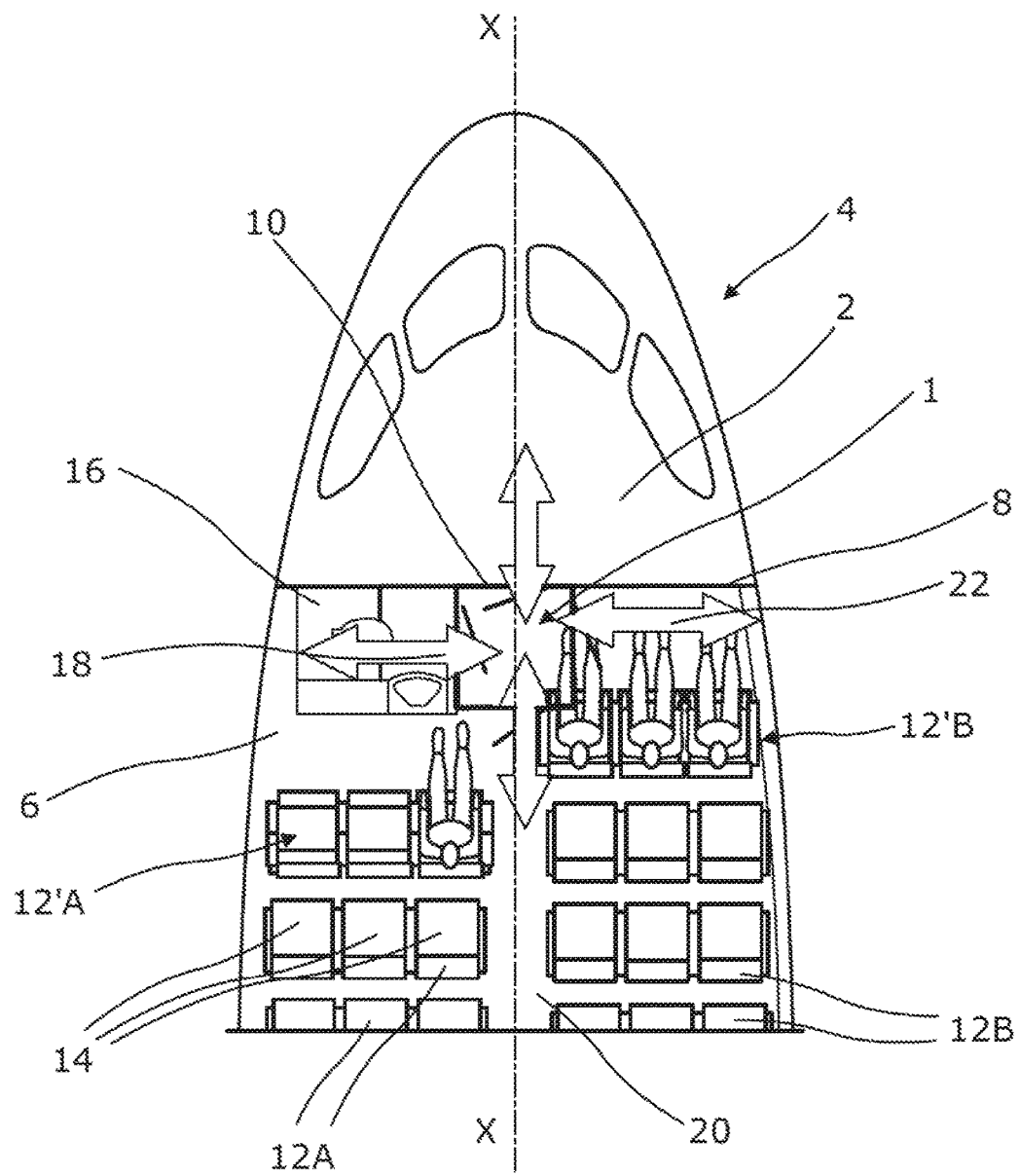
FIG. 1 is a schematic top plan view of a front part of an aircraft which is not equipped with an access device according to an embodiment of the present invention.

Generally speaking and as represented in FIG. 1, the cockpit 2 is separated from a cabin 6 by a partition 8. The partition 8 has an opening 10 allowing passage between the cockpit and cabin for the pilots, flight attendants, crew and others. The cabin 6 comprises an area provided with rows 12 of seats 14 arranged transversely to the longitudinal axis X-X of the aircraft 4, the toilet facilities 16, galleys, rest areas, storage areas or any other type of area according to a variety of layouts. The purpose of the access device 1 is to be incorporated into the aircraft in order to perform the abovementioned function between the cabin areas and the cockpit, itself forming an area.

In the embodiment illustrated in FIG. 1 and representing a particular cabin configuration, the cabin 6 comprises toilet facilities 16 adjoining the partition 8 and provided with an opening 18 providing a passage between the toilet facilities 16 and the cabin 6. Rows 12 of seats continue up to the partition 8 and up to the toilet facilities 16. A center aisle 20 separates the rows of seats 12A located transversely on the side of the toilet facilities 16 and the rows of seats 12B located on the other side. Only certain seats of rows 12A' and 12B' closest to the toilet facilities 16 and the partition 8, respectively, are represented as occupied in order to highlight the space to be provided for the legs of passengers. The access device 1 is integrated into the configuration illustrated to manage access between various areas of said illustrated configuration, namely a first area formed by the cockpit 2, a second area formed by the toilet facilities 16 and a third area formed by the passenger cabin area 6 in which the rows 12 of seats 14 are aligned. In FIG. 1, the required access points are shown by two-headed arrows: an access to the cockpit 2, an access to the toilet facilities 16, an access to the cabin 6 and more precisely to a longitudinal aisle 20 and a transversal aisle 22 of the cabin 6.

FIG. 1 shows the size of a conventional security vestibule that would require removing the passenger seats 12 closest to it.

The access device 1 is located on the longitudinal axis X-X along the continuation of the center aisle 20 and along a transverse axis passing through the toilet facilities 16 and the transverse aisle 22 located between the partition 8 and the row 12'B of seats. It is thus positioned more generally at the intersection of adjoining areas for which access management is desired while keeping the space unobstructed when such management is not required.

Figure 2:
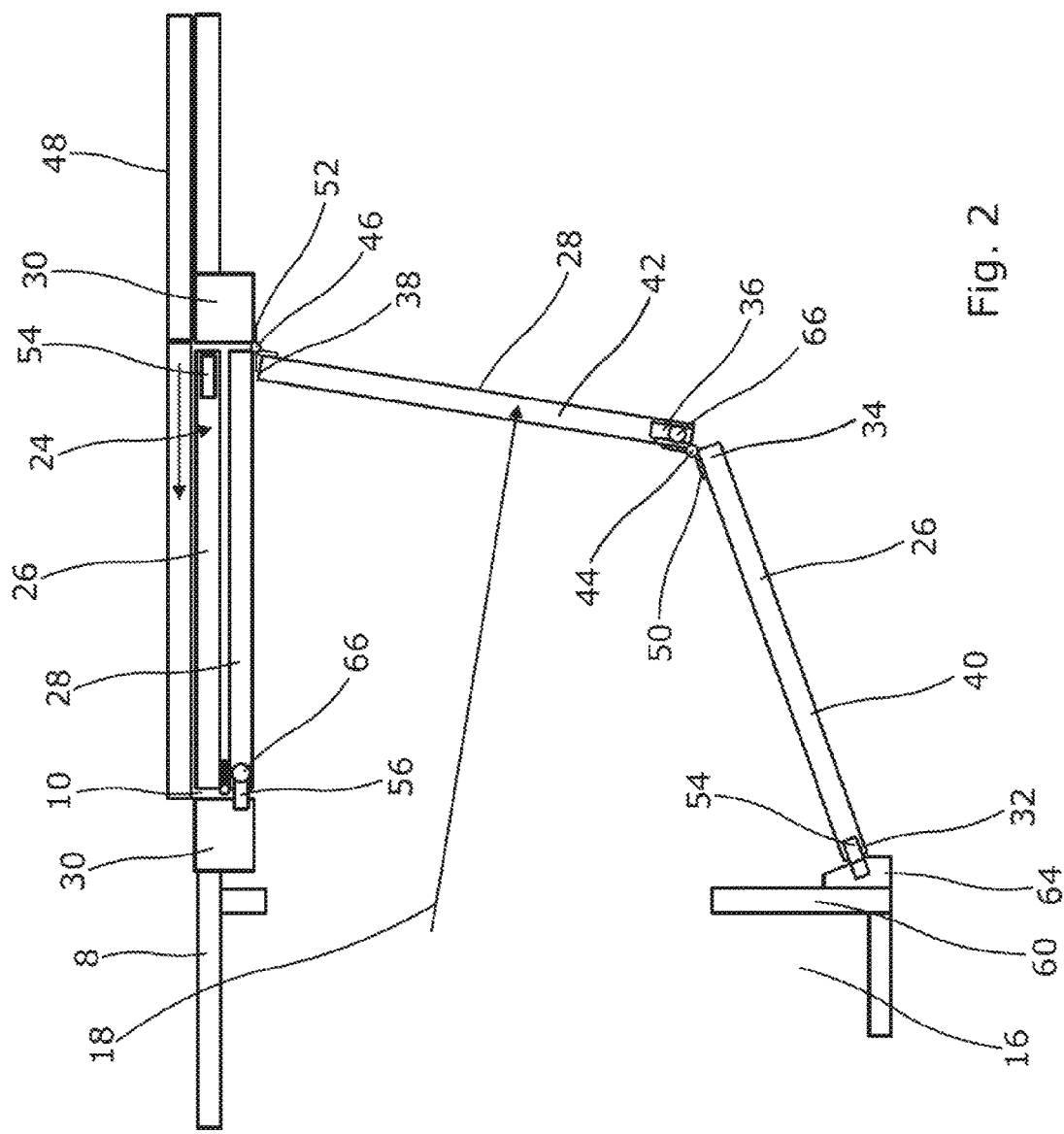
FIG. 2 is a schematic top view of an embodiment of the access device according to the present invention in two positions of use.

As shown in FIG. 2, the access device 1 includes a folding door 24 comprising at least two panels 26, 28 rotatably hinged with respect to one another. The leaves 26, 28 of the door 24 take the form of solid panels of identical shapes and sizes so as to overlap. As the door 24 is thicker than the partition 8 due to the superposition of the panels 26, 28, a reinforcement 30 is provided at the opening 10 in the partition into which the door 24 is inserted to absorb the thickness of the door so that it does not protrude with respect to the surface of the partition 8 on the cockpit side and/or the cabin side. The reinforcement 30 is also intended to provide a structural framework giving rigidity and strength to the assembly and in particular to the partition 8 and the door 24. Another solution shown in FIG. 3, to avoid that one of the panels 26, 28 is not located in the continuation of the partition 8, is to offset the partition in line with the shape of the door 24. Thus, in order to allow for an offset in the partition 8, it must consist of two parts: also in this type of configuration, the door 24 has a vertical dimension identical to that of the partition so that the door 24 separates the partition into two parts 8A and 8B. The other solution is to longitudinally shift, i.e. along the X-X axis, the part 8A of the partition located transversely on one side of the door 24 relative to the part 8B of the partition located on the other side. In the embodiment illustrated in the figures, the panels 26, 28 have a rectangular shape whose longitudinal sides 32, 34, 36, 38 are larger than the transverse sides 40, 42 (viewed from above, only the two upper transverse sides are visible in the figures). The panels 26, 28 are secured to each other along one of their longitudinal sides 34, 36. They are rotatably hinged to one another about an axis 44 parallel to the longitudinal sides 32-38 of the panels 26, 28.

The folding door 24 is secured in a rotatably hinged manner to the partition 8 and, in the embodiment illustrated in FIG. 2, to the reinforcement 30. More specifically, it is the longitudinal side 38 of a panel 28 of the door 24 opposite the side 36 that is secured to another panel 26 of the door which is secured to the reinforcement 30 in a rotatably hinged manner about an axis 46 parallel to the axis 44. The panel 28 of the door 24 is secured to the reinforcement 30. In what follows, the panel 26, secured to the panel 28, will be referred to as the free panel 26. Similarly, the free longitudinal side 32 of the free panel 26 will be referred to as the free longitudinal side 32 in what follows. In light of the rotation of the door 24 about the fixed axis 46, it should be noted that the axis of rotation 44 of a panel 26 in relation to the other 28 moves on a circular arc whose radius is identical to the width of panel 28.

The mechanical systems for hinging between panels and the panels 28 on the partition 8 and the reinforcement 30 are selected so that the folding door pivots about the axis 46 toward the exterior of the cockpit; this is due to the possible presence of a shutter 48 at the opening 10 as will be seen later. The free panel 26 pivots about the panel 28 so as to position itself on the cockpit side when the door 24 is in the closed position along the partition 8: for this reason, the panel 28 is located on the cabin side. Seen from above, if the articulation about the axis 46 of the door 24 is to the right of the opening 10 (i.e. the side of the rows 12B of seats), the panel 28 and also the panel 26 rotate in the counter clockwise direction. The panels 26, 28 turn in the same direction of rotation which facilitates handling. One simply first pivots the door 28 into the folded position about the axis 46 and then unfolds the door by pivoting the panel 28 about the axis 44. It is also possible to perform both operations or a part thereof at the same time, namely unfolding the panel 26 while rotating the panel 28.

The panels 26, 28 are hingedly secured to each other by means of hinges 50; the door 24 is hingedly secured to the partition 8 or to the reinforcement 30 by means of hinges 52.

The hinges 50, 52 are positioned so as to allow the movements described above. The hinges 50 are thus secured to the panels 26, 28 so that the hinge pin of said hinges 50 is coincident with the hinge axis 44. The hinges 52 are secured to the panel 28 and to the partition 8 or the reinforcement 30 so that the hinge pin of said hinges 52 is coincident with the hinge axis 46.

The panels 26, 28 of the door 24 comprise means for positioning and for being retained in the closed position in both the opening 10 and in the security vestibule position. The means are of known type and can, for example, be in the form of a bolt/strike system. The bolt is provided on the door 24 and the strike is provided on a fixed structure in the aircraft. According to the embodiment illustrated in FIG. 2, the panels 26, 28 are equipped with a bolt 54, 56, respectively. In the closed position of the opening 10, the bolt 54 of the panel 26 is intended to engage in a corresponding strike provided in the partition 8 or the reinforcement 30. The bolt 56 of the panel 28 is intended to engage a corresponding strike provided at the reinforcement 30. In the case of the embodiment providing a partition offset, no bolt is provided on the panel 28. In the unfolded position, the bolt 54 of the free longitudinal side 32 of the panel 26 is intended to engage a strike provided on a wall 60 of the toilet facilities and more precisely the wall 60 in which an opening 18 is provided and which is closed by a door 62. The strike is located on the side of the opening 18 furthest from the cockpit and nearest the seats 12'A. An upright 64 may be provided on the wall 60 to incorporate the strike in question. The upright is coupled and secured by any means or integrated into the wall 60.

The panels 26, 28 of the door 24 can also include all known types of position locking means. The locking means can, for example, be in the form of pins equipping the panels and cooperating with corresponding locations provided on the structure of the aircraft that can be adapted as required. In the embodiment illustrated in FIG. 2, the longitudinal edge 36 of the panel 28 associated with the other panel 26 comprises one or two pins 66 able to protrude from the transverse edges of said panel 28 to enter housings provided in specific locations on the floor and/or ceiling of the cabin: one to lock the door 24 in the closed position of the opening 10, and the other to lock the door in the unfolded position. FIGS. 4a and 4b schematically show how the pins 66 operate. In FIGS. 4a and 4b, the panel comprises two pins 66. In FIG. 4b, the pins are retracted and positioned completely inside the panel 28. The panel is then free to move. In FIG. 4a, the pins 66 are shown in the locked position: they project in relation to the peripheral lateral surface of the transverse edges so as to enter into the housings 68 provided in the floor and ceiling. The panel 28 is then immobilized.

The positioning, retaining and locking means allow the door 24 to be blocked in two different positions: a closed position of the opening 10, hereinafter referred to as the retracted position and a deployment position of the panels 26, 28 of the door 24, hereinafter referred to as the security vestibule position.

In the retracted position, the panels 26, 28 of the folding door 24 are folded against one another and the door 24 fits snugly in the opening 10 to close off access to the cockpit 2. The position is said to be retracted as the cabin space adjoining the openings 10 and 18 is cleared. All the elements that will fit together to create a secure security vestibule type are retracted: they do not take up any space in the cabin and passengers in rows 12'A and 12'B closest to the cockpit 2 experience no discomfort whatsoever. It is thus possible to bring these rows of seats closer to the cockpit and to add additional seats in the cabin in relation to a layout wherein the first rows must be moved further away owing to the size of a security vestibule, for example.

The door 24 is deployed in the security vestibule position; the panels 26, 28 pivot in relation to one another and the assembly of the two panels pivot in relation to the partition/reinforcement to encompass openings 10 and 18. To do this, it is preferable that the opening 18 of the toilet facilities 16 is closest to the cockpit 2. The dimensions of the door 24 and more precisely of the leaves 26, 28, the shutter 48 (described later), the opening 10, the opening 18, the wall 60, and the distance between the opening 18 and the opening 10 are determined so as to optimize the layout and integration of the access device 1 in this layout.

The shutter 48 is a panel likely to be moved in order to open and close the opening 10. It therefore complements the door 24 which also performs this function. In the embodiments illustrated in FIGS. 2 to 5, it slides along the partition 8 inside the cockpit 2. The sliding shutter 48 is in the form of a flat solid panel. It is attached to the partition 8 and slides in translation along rails provided in the floor and ceiling so as to close the opening 10 and to couple with the panel 26 of the door 24 when the door 24 is in the closed position. Thus when the door 24 is deployed, the shutter 48 closes off access to the cockpit. The partition 8, the shutter 48 in the closed position of the opening 10, the wall 60, the door 62 of the toilet facilities in the closed position, the panels 26, 28 of the deployed folding door 24 together form a volume, i.e. a space which is closed, confined and secure against any aggression when passing from one area to another. This closed and confined space acts as a security vestibule. In FIGS. 5a to 5d, the rails at the opening 10 have been masked to show that the shutter 48 has freed up the space at the opening 10.

All or only certain parts of the access device can be armored and, for example, each panel 26, 28 or the shutter 48. The armoring is achieved by applying a thin layer of bulletproof sheet metal.

All other embodiments different from that shown above are possible.

The sliding shutter 48 may be pivoting, for example. The kinematics may be different, such that the folding door 24 deploys to form a security vestibule with the other elements mentioned above.

The access device can be operated manually or automatically. In the case of manual control, someone in the cabin must deploy the folding door. So if someone in the cockpit wants a secure access, the person must contact a member of the cabin crew securely via radio or other means to request that the security vestibule be installed. The person must first ensure that access to the cockpit is protected by installing the shutter 48 to close the opening 10 and then ensure that the bolt/strike system and/or pin system is unlocked to allow the member of the cabin crew to move the panels 26, 28. Depending on the use and the security desired, it may be decided that it is the member of the cabin crew or the person in the cockpit who unlocks one or all of said systems. Additional visual means such as cameras can allow viewing of the area in question so as to ensure the security vestibule is properly installed. In the case of automatic control, it is similarly decided who in the cabin or in the cockpit unlocks one or all of said positioning, retaining and locking systems. The movement of panels 26, 28 of the door 24 may be controlled by all types of known means and, for example, by a motor-driven gear/rack system and associated, from the floor and the ceiling of the cabin, with the transverse edges of the free panel 26 or even the panel 28. Sensors could also be added to the automatic system to trigger movement of certain parts of the security vestibule when they detect the passage of someone in the opening 10 or 18 or in the security vestibule.

FIGS. 5a to 5d represent four states of the access device 1 when it is used in the environment described in more detail below.

As shown in FIGS. 5a to 5d, the aircraft equipped with the access device 1 is a single-aisle aircraft. The center aisle 20 is located on the same central longitudinal axis as the opening 10 allowing passage between the cockpit 2 and the cabin 6. Toilet facilities 16 are positioned against the partition 8 and on the same side of the aisle 20, and in this case, the left side of the longitudinal axis X-X facing the cockpit 2 inside the cabin 6. The toilet facilities 16 are provided with an opening 18 allowing access between the toilet facilities 16 and the cabin 2. The opening 18 is positioned very close to the cockpit 2. One of the rows 12'A of passenger seats is located near the toilet facilities 16 and one of the rows 12'B is located near the partition 8.

The access device is positioned so as to control the passages at the level of the cockpit 10 and toilet facility 18 openings, i.e. between the cockpit 2, toilet facilities 16 and cabin 6 areas. It is therefore located at the intersection of passages provided between the cockpit 2, the toilet facilities 16 and the cabin 6. The dimensions of the folding door 24, and more precisely the panels 24, 26, are determined such that they close off the opening 10 so as to block the passage between the cabin and cockpit. The dimensions of the door 62 of the toilet facilities are determined so that it closes off the opening 18 so as to block the passage between the cabin and the toilet facilities. The dimensions of the shutter 48 are determined such that it closes the opening 10 so as to block the passage between the cabin and cockpit.

In non-secure usage conditions, the access device 1 is retracted. The security vestibule, used only in the event of secure access, is not visible and the space in front of the openings 16 of the toilet facilities and cockpit 10 remains unobstructed. The access to the toilet facilities and cockpit is conventional apart from the fact that the door 24 that closes access to the cockpit 2 is a folding door which significantly modifies the conventional layout by adding reinforcement 30 or the offset of the partitions 8a, 8b.

Figure 5A:
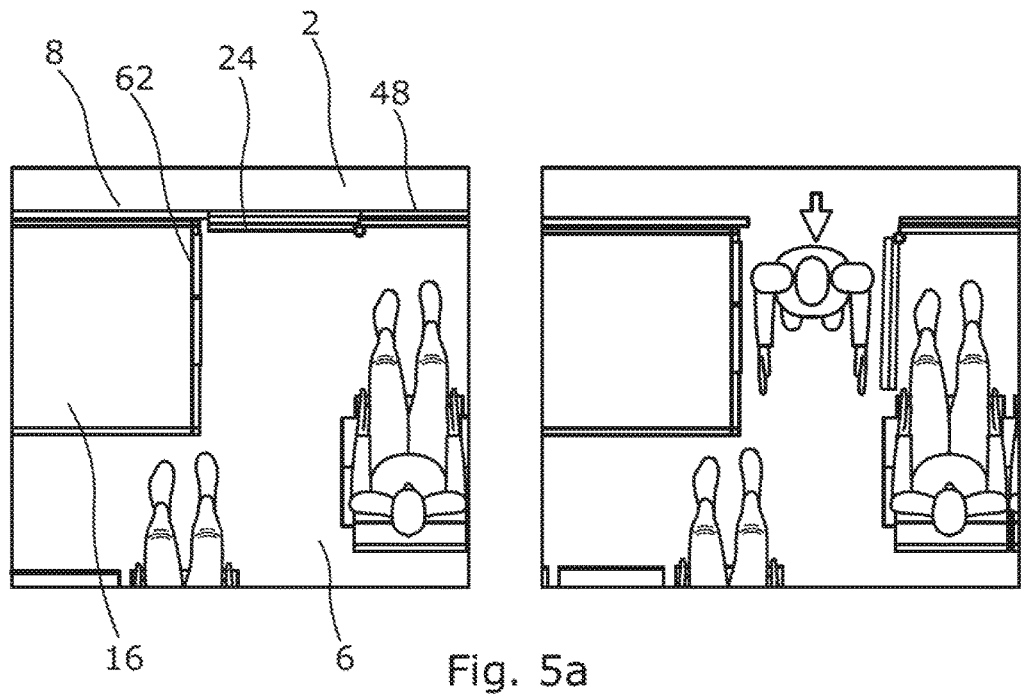
FIGS. 5a to 5d are schematic top views of positions of use of an embodiment of the access device illustrated in FIGS. 3, 4a and 4b integrated in a front part of an aircraft.

FIG. 5a represents the use of the access device 1 for non-secure control of the passage between the cockpit 2 and the cabin 6 for a driver or a stewardess, for example. The panels of the door 24 are folded onto themselves and joined to one another. Conventional means may be provided to block them against one another. The folding door 24 moves the folded panels against one another to hide or free up the opening 10 and to authorize or deny the cabin crew access to the cockpit or to authorize or deny someone in the cockpit access to the cabin.

Figure 5B:
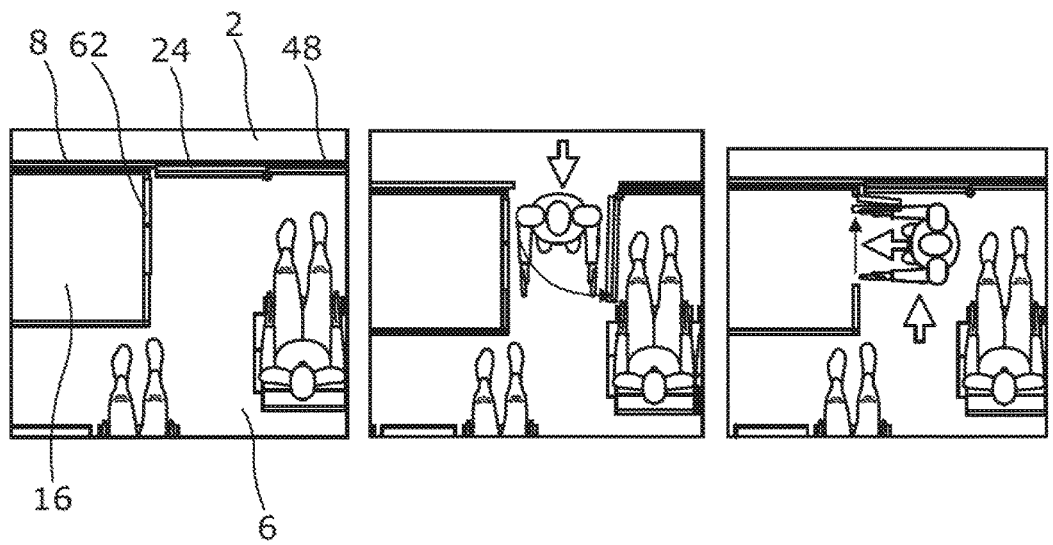

FIG. 5b represents the use of the access device 1 for non-secure control of the passage between the cabin 6 and the toilet facilities 16. The folding door 24 is positioned so as to block the passage between the cabin 6 and the cockpit 2. Access to the toilet facilities 16 is obstructed by the door 62 of the toilet facilities so as not to be visible by passengers occupying the seats of the row 12'B. The door 62 of the toilet facilities opens and closes in a conventional manner to authorize or deny access to the toilet facilities to those individuals (passengers, pilot, stewardess) requiring it.

In the two use cases described above, the access device 1 allows for conventional access control between the cabin and the cockpit and between the cabin and the toilet facilities while preventing the passengers of rows 12'A, 12'B from experiencing any discomfort in relation to these passages.

Figure 5C:
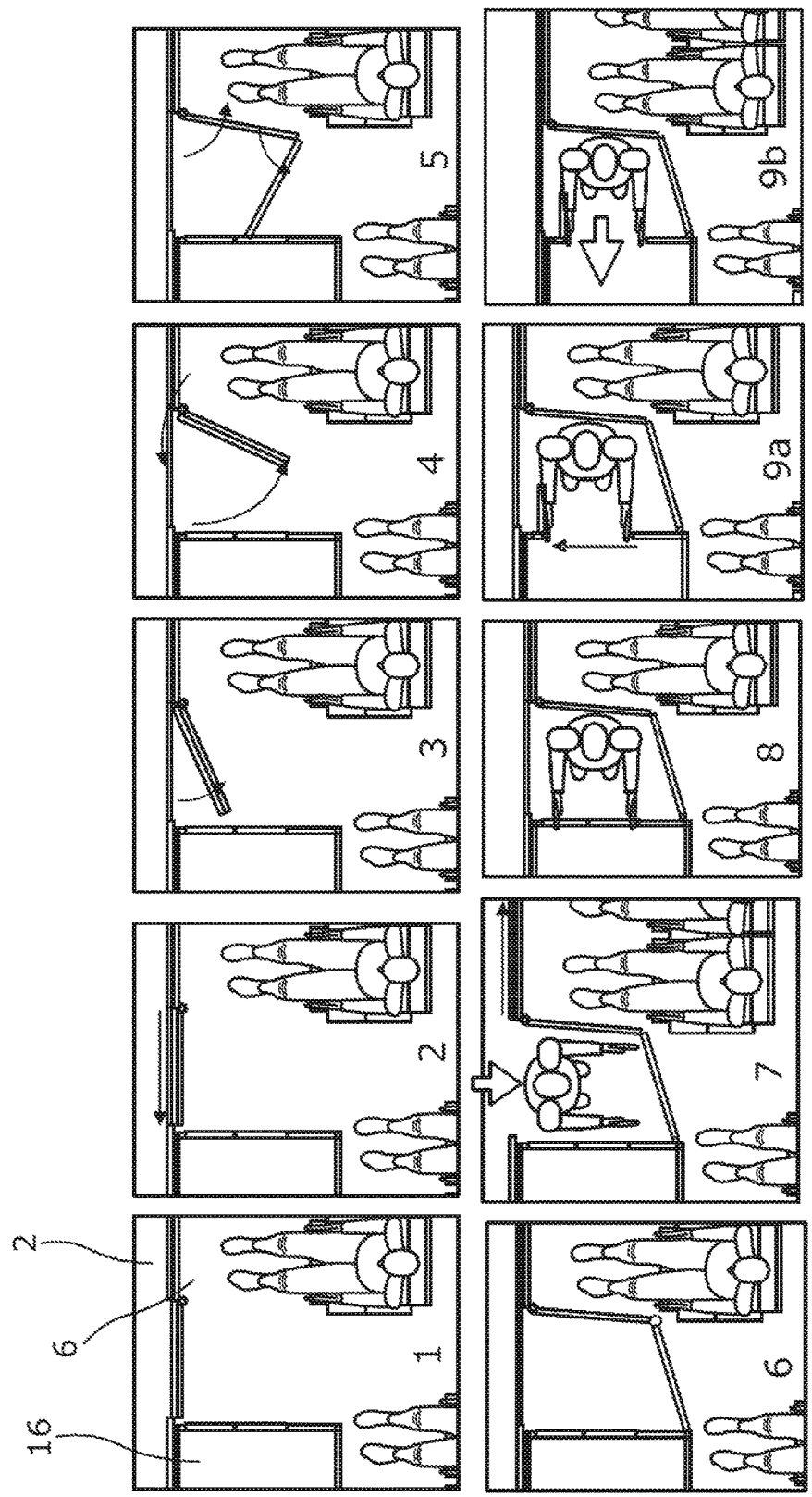

FIG. 5c represents the use of the access device 1 to allow the pilot or any other person in the cockpit to securely access the toilet facilities 16 while being protected from any possible aggression by someone in the cabin. As shown in FIG. 5c, each step bears a number and is represented by a specific diagram. During the first step, the person is located in the cockpit and the folding door 24 in the closed position: the retaining, positioning and locking means are engaged to block the door 24 in position. In step 2, whether the control is manual or automatic, the person in the cockpit triggers the movement of the sliding shutter 48, represented by an arrow. The shutter 48 moves in translation and takes up position in front of the opening 10 and the folding door 24. In step 3, the retaining, positioning and locking means are released: the bolts 54, 56 are removed from the corresponding strikes and the pin 66 is removed from its housing. The folding door 24 pivots about the axis 46 in the direction of the arrow as shown in the figure, the panels 26, 28 of the door 24 remaining folded onto themselves and coupled to one another during this rotation. Conventional means may be provided to block the panels against one another. In steps 4 and 5, the door 24 unfolds: while continuing its rotation about the axis 46, the panels 26, 28 pivot about the axis 44 (see the direction of rotation in the figures) so that the panels diverge from one another to form a V-shaped hat opening gradually to cover the openings 10 and 18. In step 6, the retaining, positioning and locking means of the folding door 24 are triggered to block the door 24 in the security vestibule position. The bolt 54 fits into a corresponding strike provided on the upright 64 of the wall 60 of the toilet facilities 16. In step 7, with the security vestibule in place and blocked in position, the person in the cockpit triggers the movement of the sliding shutter 48 to free up the opening 10 and thus the access to the security vestibule. The person can then enter the security vestibule formed by the partition 8, the wall 60, the door 62 of the toilet facilities and panels 26, 28, for which access via the partition 8 is freed by the movement of the shutter 48.

In step 8, the person in the security vestibule triggers the movement of the shutter 48: the sliding shutter 48 returns to the closed position of the cockpit to prevent intrusion into the cockpit by someone possibly hiding in the toilet facilities, for example. In steps 9a and 9b, the person can then access the toilet facilities by simply opening the door 62 of the toilet facilities and closing it once inside. Two options are thus possible: the security vestibule remains in position or it retracts and redeploys when the person wants to return to the cockpit. To regain the cockpit, the operations take place in reverse order. The present invention offers a completely secure solution for access between the cockpit and the toilet facilities while avoiding a cumbersome system in the cabin.

Figure 5D:
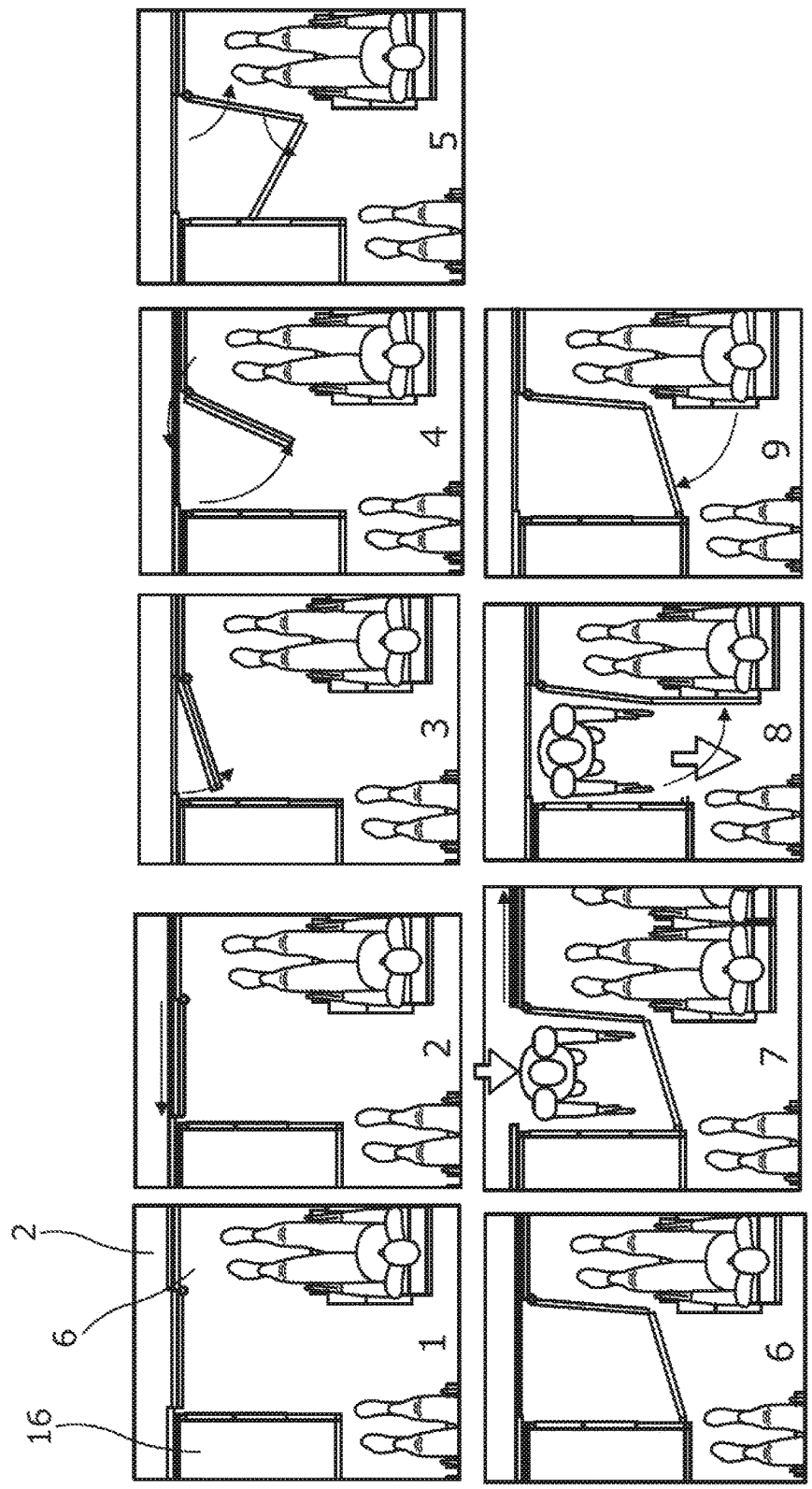

FIG. 5d represents the use of the access device 1 in a secure manner to allow the pilot or any other person in the cockpit to access the cabin, while being protected from any possible aggression by someone in the cabin. The use of the access device 1 to allow a stewardess or any other person in the cabin access to the cockpit 2 is performed in the same manner in the reverse order of the steps, the first step, as will be seen later, consisting in implementing the security vestibule. As in FIG. 5c, each step in FIG. 5d is numbered and is represented by a specific diagram. In the first step, the folding door 24 is in the closed position: the retaining, positioning and locking means are engaged to block the door 24 in position. In step 2, whether the control is manual or automatic, the person in the cockpit or a person in the cabin contacted by the person in the cockpit triggers the movement of the sliding shutter 48. The shutter 48 moves in translation, represented by the arrow, and takes up position in front of the opening 10 and the folding door 24. In step 3, the retaining, positioning and locking means are released: the bolts 54, 56 are removed from the corresponding strikes and the pin 66 is removed from its housing. The folding door 24 pivots about the axis 46 in the direction represented by an arrow in the figure, while the panels 26, 28 of the door 24 remain folded onto themselves and coupled to one another during this rotation. Conventional means may be provided to block them against one another. In steps 4 and 5, the door 24 unfolds: while continuing its rotation about the axis 46, the panels 26, 28 pivot about the axis 44 (see the direction of rotation in the figures) so that the panels diverge from one another to form a V-shaped hat opening gradually to cover the openings 10 and 18. In step 6, the retaining, positioning and locking means of the folding door 24 are triggered to block the door 24 in the security vestibule position. The bolt 54 fits into a corresponding strike provided on the upright 64 of the wall 60 of the toilet facilities 16. In step 7, the security vestibule being in place and blocked in position, the person in the cockpit triggers the movement of the sliding shutter 48 to free up the opening 10 and thus the access to the security vestibule. The person can then enter the security vestibule formed by the partition 8, the wall 60, the door 62 of the toilet facilities and panels 26, 28, for which access via the partition 8 is freed by the movement of the shutter 48. In step 8, the person in the security vestibule triggers the movement of the shutter 48: the sliding shutter 48 returns to the closed position of the cockpit to prevent intrusion into the cockpit by someone in the cabin. In steps 8 and 9, the person can then access the cabin by rotating the free panel 26 about the axis 44, the panel 28 being held in position by the locking means and more particularly by the pins 66. To return the cockpit or allow someone in the cabin to enter the cockpit, the operations take place in reverse. It can therefore be seen, as previously noted, that the first step in providing secure access into the cockpit to someone in the cabin involves implementing the security vestibule. The present invention offers a completely secure solution for access between the cockpit and the cabin while avoiding a cumbersome system in the cabin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An access device enabling secure communication between at least two areas of an enclosure through at least one opening, the access device comprising: a folding door having at least first and second panels, the folding door, when in a folded position, is configured to close the at least one opening and, when in a deployed position, forms a security vestibule comprising the first and second panels; and at least one movable shutter configured to close said at least one opening created by the deployment of said folding door, wherein the security vestibule is formed by the at least first and second panels of the folding door, the movable shutter and walls between said areas of said enclosure, as well as a second door at the level of at least one of said walls.

2. The access device as claimed in claim 1, wherein the at least first and second panels in the form of two solid panels are rotatably hinged relative to one another, and
   wherein shape and identical dimensions of the at least first and second panels are such that the first and second panels overlap and fit together snugly in said opening so as to completely close said opening.

3. The access device as claimed in claim 1, wherein one of longitudinal edges of said folding door is rotatably hinged at the one of longitudinal edges of said opening that said folding door is configured to close.

4. The access device as claimed in claim 1, wherein the at least movable shutter is placed against a partition separating two areas, is configured to move in translation along the partition and has dimensions such that the movable shutter completely fills the opening in said partition to close the opening.

5. The access device as claimed in claim 1, further comprising retaining, positioning and locking means provided on the folding door and cooperating with corresponding means provided on stationary structures of the enclosure to block the folding door in the closed folded position and in the deployed security vestibule position.

6. The access device as claimed in claim 1, further comprising reinforcements provided at edges of the partition adjacent to the folding door to absorb a thickness of the folding door.

7. The access device as claimed in claim 1, wherein the partition adjacent to the folding door includes two offset parts to absorb the thickness of the folding door.

8. An aircraft comprising at least two areas and an access device enabling secure communication therebetween through at least one opening, the access device comprising: a folding door having at least first and second panels, the folding door, when in a folded position, is configured to close the at least one opening and, when in a deployed position, forms a security vestibule comprising the first and second panels; and at least one movable shutter configured to close said at least one opening created by the deployment of said folding door, wherein the security vestibule is formed by the at least first and second panels of the folding door, the movable shutter and walls between said areas of said enclosure, as well as a second door at the level of at least one of said walls.

9. The aircraft as claimed in claim 8 wherein one of the two areas is the cockpit, another of the two areas is the cabin and the folding door closes the access between the cabin and cockpit.

10. The aircraft as claimed in claim 9, wherein another of the two areas are the toilet facilities and the deployed folding door rests on one of the walls of toilet facilities to form a security vestibule with said wall, the second door, the partition and the shutter.

11. An access control method for secure communication between at least two areas of an enclosure through at least one opening, the method comprising: deploying a folding door having at least first and second panels from a folded position in which the folding door closes the at least one opening to a position wherein the folding door forms a security vestibule comprising the first and second panels and creates the at least one opening; and closing the at least one opening created by the deployment of the folding door with at least one movable shutter, wherein the security vestibule is formed by the at least first and second panels of the folding door, the movable shutter and walls between said areas of said enclosure, as well as a second door at the level of at least one of said walls.

* * * * *